April 13, 1926. 1,580,887
J. L. HERMAN
APPARATUS FOR COATING AND TREATING METALLIC MATERIALS
Filed April 26, 1923  5 Sheets-Sheet 1
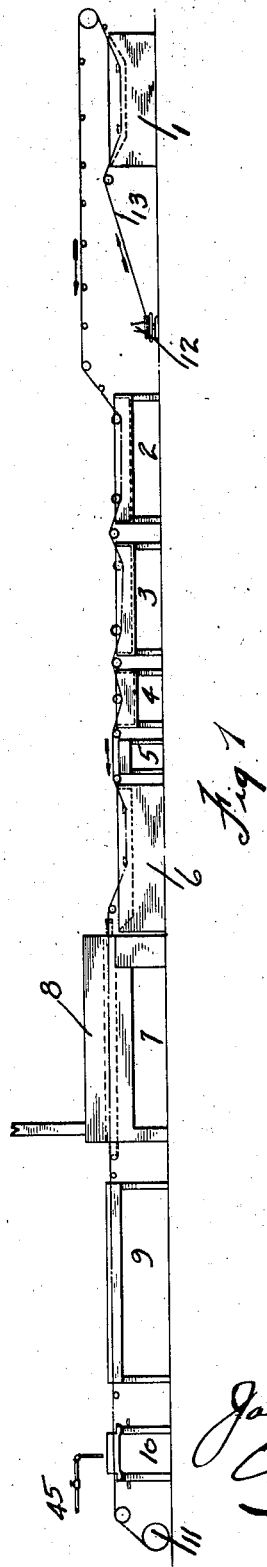

April 13, 1926.
1,580,887
J. L. HERMAN
APPARATUS FOR COATING AND TREATING METALLIC MATERIALS
Filed April 26, 1923   5 Sheets-Sheet 2
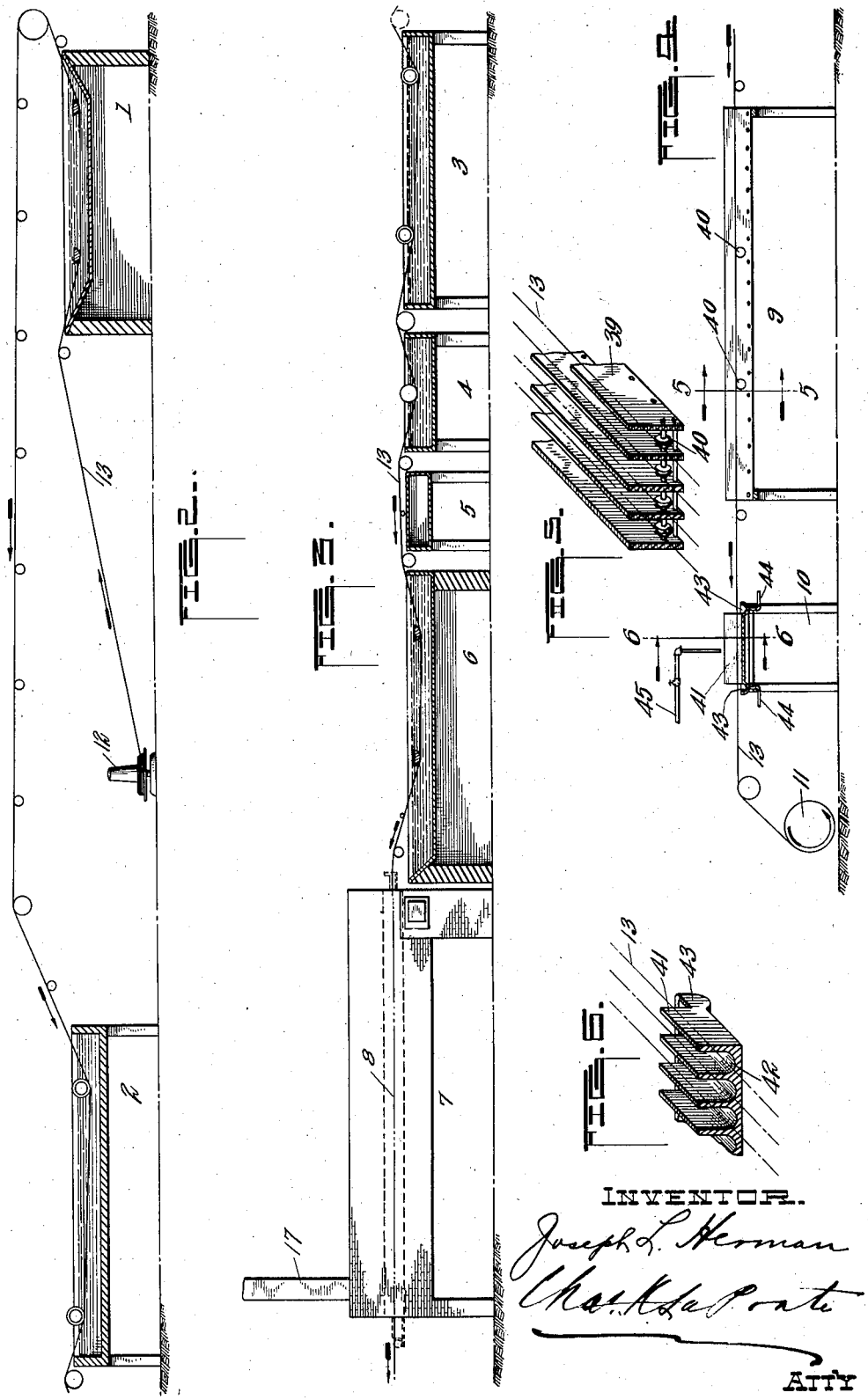

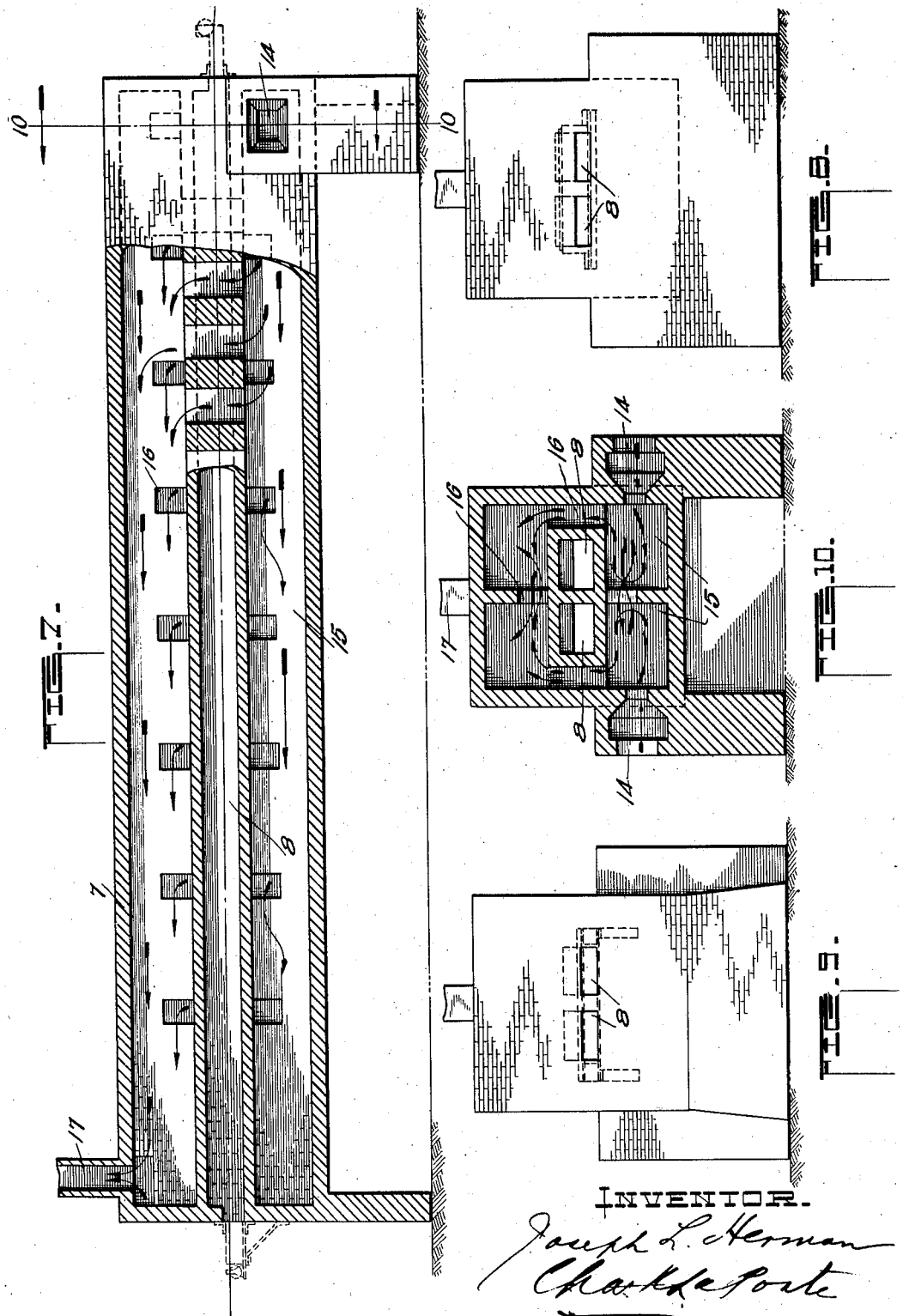

April 13, 1926. 1,580,887

J. L. HERMAN

APPARATUS FOR COATING AND TREATING METALLIC MATERIALS

Filed April 26, 1923  5 Sheets-Sheet 4

INVENTOR.
Joseph L. Herman
Charles LaPonte
ATTY

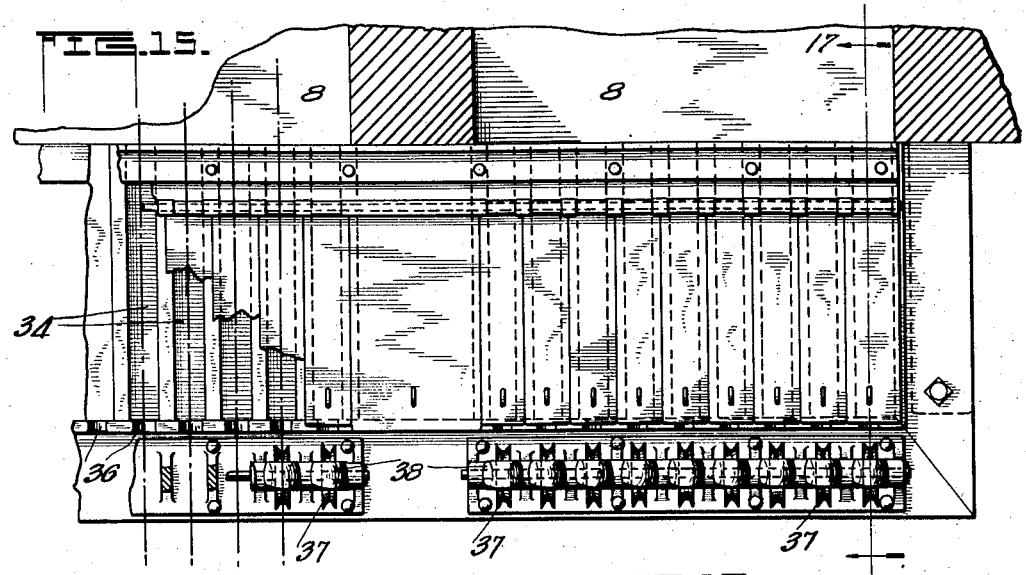
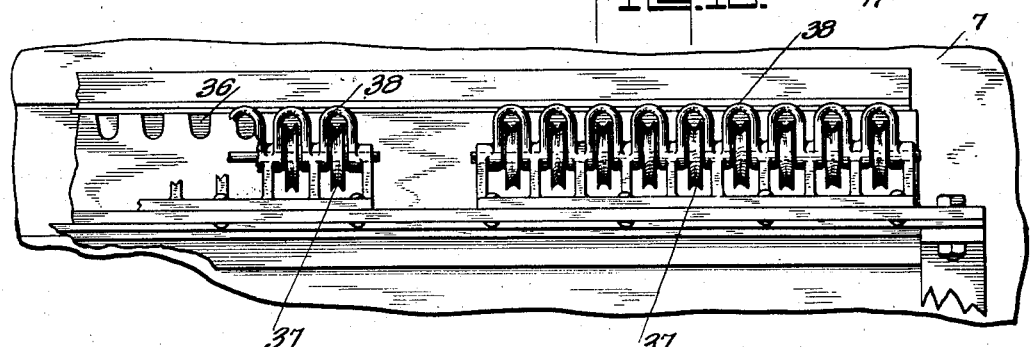
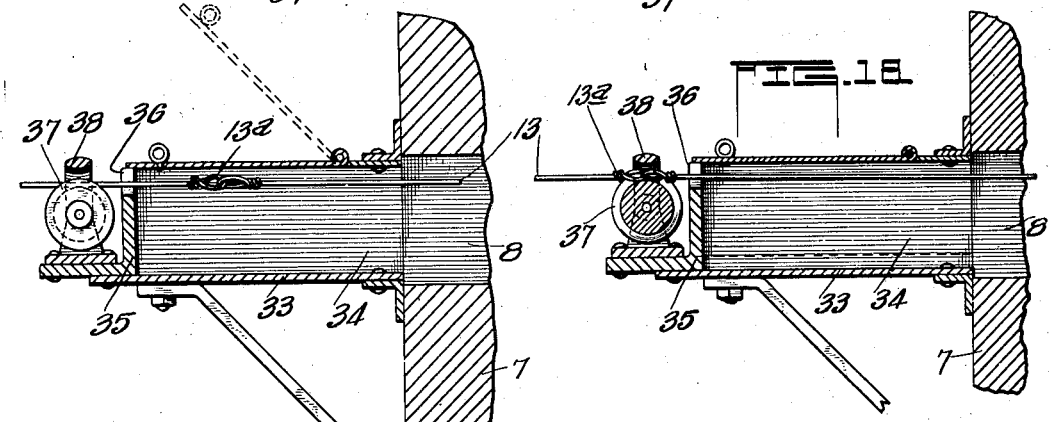

Patented Apr. 13, 1926.

1,580,887

UNITED STATES PATENT OFFICE.

JOSEPH L. HERMAN, OF PEORIA, ILLINOIS, ASSIGNOR TO MIDLAND MANUFACTURING COMPANY, OF PEORIA, ILLINOIS, A CORPORATION OF ILLINOIS.

APPARATUS FOR COATING AND TREATING METALLIC MATERIALS.

Application filed April 26, 1923. Serial No. 634,773.

*To all whom it may concern:*

Be it known that I, JOSEPH L. HERMAN, a citizen of the United States, residing at Peoria, in the county of Peoria and State of Illinois, have invented new and useful Improvements in an Apparatus for Coating and Treating Metallic Materials, of which the following is a specification.

This invention has reference to an apparatus for coating and treating materials having an iron base and particularly the coating and treatment of wire used in the fence industry and for telephone and other purposes.

The invention has for its principal object to provide an apparatus for carrying out the process shown and described in Letters Patent issued to me October 3, 1922, No. 1,430,648 for a process of coating and treating materials having an iron base.

The invention has for a further object an apparatus of the character described, including a heat-treating furnace through which the coated material is drawn immediately upon its leaving the molten-bath, and in which the coated material is heat-treated; such treatment having for its object to produce a coating more resistant to atmospheric rusting and corroding conditions than for ordinary galvanized wire, and which further will permit a heavier coated wire to be used in wire-fabricating machines without causing the coating to crack or flake off, as is the case with heavily coated galvanized wire coated by means of an ordinary galvanizing apparatus.

A further object of the invention is a galvanizing apparatus including a heat-treating furnace adapted for the heat-treatment of coated wire immediately upon the wire leaving the molten bath, such furnace embodying one or more heat-treating chambers through which the coated wires are drawn, the wires being adapted to be heat-treated by means of heat radiated from the walls of the chambers, the fuel employed for heating the furnace comprising oil, gas, or any other well known heating means.

A further object of the invention is a galvanizing apparatus, including a furnace for heat-treating coated wire immediately upon its leaving the molten bath, tension devices for the wires being suitably located to hold the wires taut as they are drawn through the heat-treating furnace and to reduce the vibration of such wires, as they are moved through the furnace, to a minimum.

A further object of the invention is to provide in the galvanizing apparatus a heat-treating furnace for the coated wire immediately upon its leaving the molten-bath, said furnace being preferably located between the molten-bath and the take-up frame or cooling devices or both.

A still further object of the invention is to provide in a galvanizing apparatus a heat-treating furnace adapted to receive and heat-treat the coated wires immediately upon their leaving the molten-bath and in the provision of skimmers located between the molten-bath and entrance to the furnace, said skimmers adapted to remove skimmings, dross or other foreign matter which might adhere to the molten coating metal as it leaves the molten-bath, but without materially reducing the thickness or the amount of the coating metal on the wire, said skimmers being arranged to be automatically operated by contact of joints in the wires and to permit the passage of such joints without the formation of "reachers."

A still further object of the invention is the provision of a heat-treating furnace in a galvanizing apparatus adapted for the heat-treating of the coated wires immediately upon their leaving the molten-bath, the ingress and egress openings for the wires at the front and rear ends of the furnace being reduced to a minimum and constructed so as to practically prevent the infiltration of cold air into the heat-treating chambers of such furnace.

That the invention may be more fully understood reference is had to the accompanying drawings forming a part of the application illustrating a preferred embodiment of the invention, in which;

Fig. 1 is a diagrammatic elevation of an apparatus embodying my invention;

Figs. 2, 3 and 4 when taken together illustrate in side elevation, partly in section, a complete galvanizing apparatus embodying my invention, and includes in addition to the heat-treating furnace the annealer, acid bath, flux bath, drier, molten-metal bath, take-up frame, water cooling table and blocks; each of the respective elements and associated parts and tensioning devices being on a greatly reduced scale and more or less diagrammatic in character;

Fig. 5 is a detailed perspective view showing the construction of the take-up frame and somewhat as the same would appear if taken on the line 5—5 Fig. 4;

Fig. 6 is a detailed perspective view showing the construction of the water cooling table and more or less as the same would appear if taken on the line 6—6 of Fig. 4;

Fig. 7 is a detailed sectional view of the heat-treating furnace, illustrating one of the wire heat-treating chambers and longitudinal and transverse flues for the passage of the products of combustion there-around and along the walls of the heat-treating chambers;

Fig. 8 is a front elevation showing the structural outline of the furnace;

Fig. 9 is a similar view of the rear end of the furnace;

Fig. 10 is a transverse sectional view of the furnace as the same would appear if taken on the line 10—10 Fig. 7. Arrows are used to indicate the entrance of the products of combustion into the furnace showing the same directed around and along the walls of the heat-treating chambers;

Fig. 15 is a detail in plan, partly in section, and partly broken away, showing the rear end furnace construction and the tensioning and guiding rollers for the heat-treated wires leaving the heat-treating chambers of the furnace;

Fig. 16 is a detail elevation, partly broken away, showing the guiding and tensioning rollers in Fig. 15 and the openings for the heat-treated wires leaving the furnace;

Fig. 17 is a detail longitudinal sectional view, as the same would appear if taken on the line 17—17, Fig. 15, showing a joint in the wire approaching one of the guiding and tensioning rollers;

Fig. 18 is a view similar to Fig. 17 but with the joint in the wire passing over the guiding and tensioning rollers.

Like characters of reference denote corresponding parts throughout the figures.

Figure 12:
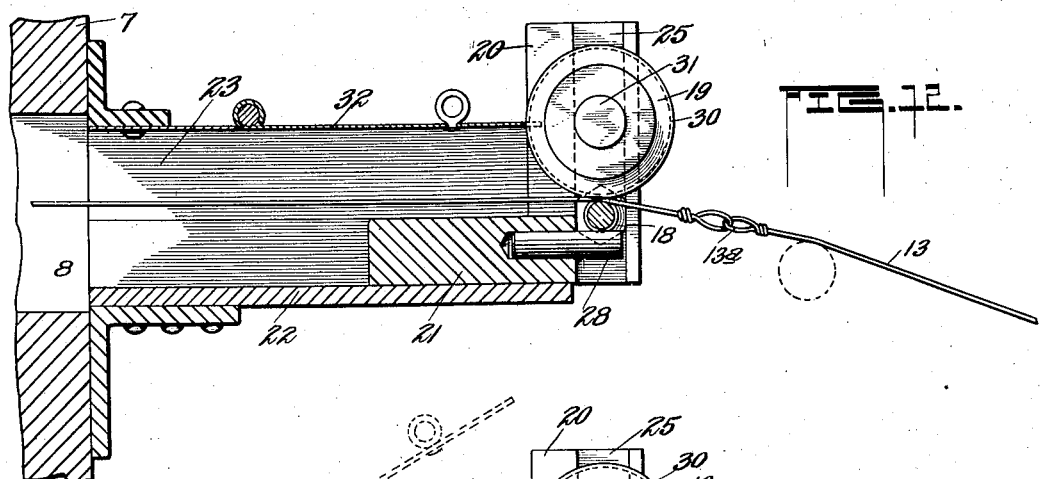
Fig. 12 is a detailed sectional view, partly in elevation, as the same would appear if taken on the line 12—12 Fig. 11 and showing a wire to be heat-treated passing into the furnace and just prior to the actuation of the skimmer by a joint in the wire coming in contact therewith.
Figure 13:
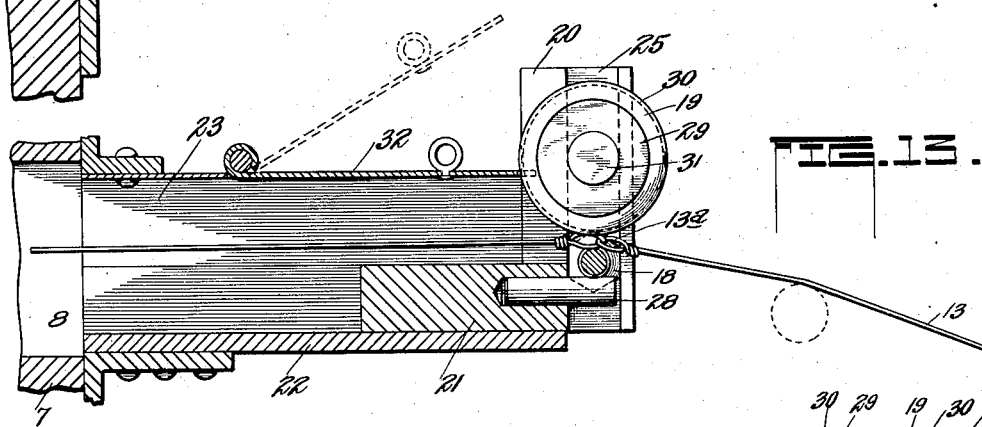
Fig. 13 is a view similar to Figure 12, except that it shows the joint in the wire in the act of operating a skimmer to permit the passage of the joint into the furnace.

The apparatus for carrying out the improved process of coating and treating materials having an iron base, such as is described and claimed in my Patent No. 1,430,648 includes the annealer 1, preferably of the lead-pan type, although it may be of any other suitable structure; the acid-tanks 2 and 3 adapted to contain a suitable cleaning acid. I have elected to show two acid tanks, particularly in view of it being a continuous process; whereby when the acid in one tank becomes too weak or dirty that the other tank may be used. While they may be used simultaneously, it is preferable to use them alternately. The apparatus further includes a flux bath 4, adapted to contain a suitable fluxing material such as zinc chloride for the purposes which such fluxes are ordinarily used in coating processes of the character; a drier 5 to insure the material entering into the molten-bath in a comparatively dry state, and the molten-metal coating bath 6 which, in this instance, would contain spelter. Adjoining the molten-metal bath, for the purpose of heat-treating the coated material as it leaves said bath, is a heat-treating furnace 7 provided with one or more longitudinally disposed heat-treating chambers 8 through which the coated material is drawn and heat-treated. The details of such furnace and its mode of functioning will be hereinafter more particularly described. Adjoining the heat-treating furnace 7 and adapted to receive the heat-treated coating material, as it leaves the furnace, is a take-up frame 9. This take-up frame functions to keep the material under tension as it passes through the furnace and prevents whipping of such material, particularly wires, while passing through the furnace. Adjoining the take-up frame 9 is a water cooling table 10 over which the heat-treated material passes before being coiled on blocks 11, of which there are preferably one for each of the wires coated and heat-treated.

As shown, the apparatus is intended more particularly for galvanizing wire by a continuous process and if Figs. 2, 3 and 4 were placed in line with each other, as would be the case in the actual use of the apparatus and as shown in Fig. 1, it will be observed that the wires after they leave the reels 12 are drawn through the several units of the apparatus by the winding blocks 11 in as near a horizontal line as it is possible to carry the wires. The guiding and tensioning rollers over which the wires are carried tend to hold the wires taut and prevent vibration and whipping. It is not thought necessary to specifically refer to the guiding and tensioning rollers or other devices which are shown at suitable points throughout the apparatus, or the sinkers, shoes or tile which are employed in connection with certain of the units to hold the wires submerged in the liquids or molten metal contained therein. In each of the respective Figs. 2, 3 and 4 a wire 13 is shown, being the same wire throughout for the purpose of illustrating the use of the apparatus in the preparation of the wire, the coating thereof and the heat-treatment subsequent to the coating step. It is understood that in an apparatus of this character the structure would provide for the preparation, coating and heat-treating of a plurality of wires.

In Figs. 7, 8, 9 and 10, I have illustrated one form of furnace which might be used, as the unit for heat-treating the coated materials immediately upon their leaving the coating bath. All that is essential in a furnace of this character is to provide one or more heat-treating chambers through which the material may be drawn and subjected to heat of a suitable temperature, preferably by radiation from the walls of the heat-treating chambers. It is further important that the materials, wires in this instance, shall be held against vibration within the heat-treating chambers as they are drawn thereinto, so as to be maintained out of contact with the walls of the furnace. This prevents injury to the coating, which is in a plastic condition during the passage of the wires through the furnace. The walls of the heat-treating chambers 8, of which there are preferably two, are subjected to heat from the products of combustion formed by the burning of a suitable fuel which finds entrance to the furnace through ports 14, on either side of the furnace and which traverses the furnace longitudinally and transversely thereof through the respective passages or flues 15 and 16, somewhat in the manner shown by the arrows in Figs. 7 and 10. Communicating ports 16 are provided between the flues 15 so as to insure a complete transference of the heat from the products of combustion to the respective walls of the heating chambers 8; the products of combustion finally escaping from the furnace through the stack 17. An examination of Figs. 7, 8, 9 and 10 will show that the openings at the opposite ends of the chambers 8 are much smaller than the cross sectional area of the chambers. Such structure is for the purpose of restricting and preventing as far as possible, the infiltration of cold air into the heat-treating chambers so that an approximately uniform temperature may be maintained in said chambers. These openings at the entrance and exit ends of the heating chambers are further protected against the infiltration of air into such chambers by a structure which will be further described, in connection with skimmers, the latter being located between the coating bath and the entrance end of the heat-treating chambers, and with guiding and tensioning rollers at the opposite end of the furnace. I have not thought it necessary to show the furnace provided with a fuel burner, as such burners are well known. While I prefer to burn oil and to provide an oil-burner, it is to be distinctly understood that any other character of fuel may be employed and suitable arrangements made for obtaining heat therefrom.

In my Patent No. 1,430,648 I brought out the fact that a process such as therein shown and described obviated the necessity of using wipers or other smoothing mediums for the coated wires leaving the molten-bath, and which heretofore were considered indispensible by all wire galvanizers. The reason for this is due to the action of the heat-treating furnace which not only heat-treats per se, but also evens up the coating as though it had been passed between wipers. It is further stated in said patent that another advantage in the elimination of the wipers is that a heavier coating is permitted to remain on the wire, which in ordinary practice would be removed by the wipers as the wires pass there-between. The fact that the coated wire is not wiped as it leaves the molten-bath allows a heavier coating to remain upon the wire. Such wire when subjected to the action of the heat-treatment will not only cause the heavy coating to distribute itself around the wire but eliminates brittleness of the coating. Like in the process described in said patent, the present apparatus obviates the use of wipers; however, I provide skimmers which are located between the molten-bath and the entrance to the heating chambers of the heat-treated furnace. These skimmers neither wipe nor smooth the wires, as would wipers such as are ordinarily used. In the art of galvanizing several different types of wipers are employed, designated as pressure-wipers, of the screw or lever types, and charcoal wipers such as are used in connection with the coating of telephone and telegraph wires. The skimmers which I employ have for their object the removal of skimmings, dross and any foreign matter which may collect on the coatings as the coated wires emerge from the coating bath. Of course, I appreciate the fact that the surface of the molten coating metal at the points where the wires emerge therefrom may be kept free of dross, skimmings and foreign matter in a well known manner by the use of salammoniac, but this practice is recognized as being too costly for wire galvanizing purposes, and therefore to insure that the coated wires shall enter the heat-treating furnace free of all dross, skimmings and foreign matter, I have provided mechanical skimmers which accomplish the purpose sought but without in any way removing the molten-metal adhering to the wires. Furthermore, as will be explained, the skimmers which I employ, not only prevent "reachers" forming on the wires, but such skimmers are adapted to be actuated by the joints in the wires to permit their passage of the latter into the furnace.

Figures 11, 14:
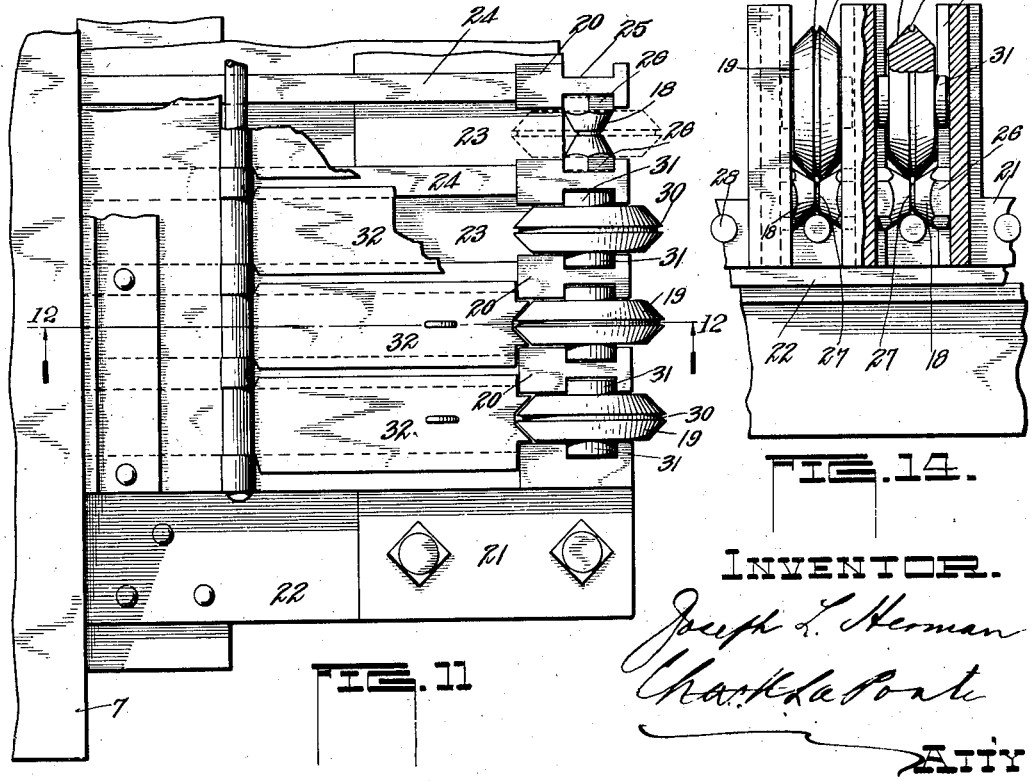
Fig. 11 is a detail in plan, partly broken away, showing a form of skimmer supporting means and associated parts, located at the front end of the furnace.
Fig. 14 is a detailed front elevation, partly in section, looking in at the skimmer structure shown at the right hand side of Figure 11.

A preferred form of skimmer structure is shown in Figs. 11 to 14 both inclusive, dotted lines indicating in a diagrammatic way the application of the skimmer structure to the front end of the furnace 7, see Figs. 3 and 7. As will be understood, there is a skimmer for each wire 13 leaving the coating bath and entering the furnace, and each skimmer preferably includes two members 18 and 19 in superimposed relation. Said members are removable, adjustable and interchangeable in upstanding guides 20 provided on a support 21 connected with a housing 22 supported on the front end wall of the furnace and extending transversally thereof and positioned in front of the entrance end of the heat-treating chambers 8 whereby the wires 13 may be guided into said heating chambers. The housing 22 is separated into a plurality of spaced chambers 23 separated from each other by the longitudinal partitions 24 at the forward ends of which are disposed the guides 20 formed with vertically disposed grooves 25 in their opposite faces for the insertion and removal of the skimmer members and in which the members 19 hold their position by weight of gravity, or in other words, merely float in the guides and are adapted to be turned by contact of the joints 13ª in the wires 13; again dropping into position as the joints 13ª pass beneath the members 19. The members 18 of the skimmers have opposite polygonal ends 26 to adapt them to have a sliding relation in the grooves 25 of the guides 20 and to provide for the turning of the members 18 after they have been removed from the guides and reinserted to present new surfaces to the wires 13 passing over the same into the furnace. As shown in Fig. 14 the members 18 of the skimmers are provided with oppositely converging surfaces terminating in a concentric groove or slot 27 and said members when in position rest upon stems 28 secured in the support 21, space being left therearound for the drip of skimmings, dross or foreign matter removed from the coating on the wires 13 by the skimmers, which preferably drains back into the molten-metal-bath 6, this being made possible by the location of the skimmers above the molten-metal-bath 6, as shown in dotted lines in Fig. 3. The members 19 of the skimmers comprise disks 29 having the oppositely disposed tapered peripheries terminating in a centrally disposed concentric groove or slot 30 corresponding to the groove or slot 27 in the lower members 18. The width and depth of the grooves or slots 27 and 30 of the respective skimmer members will be determined by the gauge or the size of the wires that are to be passed therebetween. Each of the disks 29 comprising the member 19, are provided with trunnions 31 which have bearings in the grooves 25 of the guides 20 and will allow for the raising and turning of said members 19 through contact of the joints 13ª in the wires 13 therewith. In active position the skimmer members 19 rest upon the skimmer members 18 their sloping or tapered surfaces being of such a character that the slots or grooves in the said members form an opening between the same for the passage of the coated wires 13 there-between, said slots or grooves together providing an opening of sufficient size to permit the bodies of the coated wires to pass there-between without any wiping or smoothing action of the skimmer members on the coating itself, but, acting to skim the coatings of any dross, skimmings or foreign matter which might collect on the coatings as the wires leave the molten-metal-bath. The operation of passing the bodies of the coated wires 13 between the skimmer members 18 and 19, when in their normal position is best seen in Fig. 12. In said figure and in Fig. 13 two lengths of wire 13 are shown joined in the customary manner by joints 13ª. When this joint comes into contact with the skimmer it will both raise and turn the floating member 19 so as to permit the joint to pass the skimmers and to enter the heat-treating furnace. It will be observed that the skimmers act upon the body of the coated wires 13 up to the point of the contact of the twisted portion of one joint 13ª before the floating member 19 is acted upon the latter dropping back into position immediately upon the other coil of the joint passing such skimmer and thereby obviate the formation of "reachers." This eliminates the reacher losses formed in other well know methods of galvanizing and particularly where wipers are used. It will be observed looking at the housing 22, both in front and sectional elevations, that there is very little, if any, space left around the skimmers through which air might enter and thus reduce the temperature of the heat-treating chambers of the furnace. Each of the chambers 23 in the housing 22 is provided with a hinged lid or cover 32 to permit access to be had into such chambers and into the entrance ways of the heating chambers of the furnace.

At the rear end of the heat-treating furnace there is provided a transversally disposed housing 33 somewhat similar in construction to the housing 22 at the front end, in that said housing is divided into a plurality of chambers 34 communicating with the heat-treating chambers 8 in the furnace. The rear wall 35 of the housing 33, which also forms a closure for the respective chambers 34, is provided with a plurality of spaced openings 36 for the egress of the coated and heat-treated wires from the furnace, such openings 36 being only sufficiently large to receive the wires and also large enough for the passage of the joints 13ª there-through, best seen in Figs. 17 and 18. Suitably journaled on a support connected with the rear wall 35 of the housing 33 are a plurality of guiding and tensioning rollers 37, one disposed in front of each of the openings 36 in said rear wall, and said guiding and tensioning rollers have associated therewith an over-hanging guard 38 to prevent the wires from becoming dislodged from the said rollers. In this connection it is to be observed that the only supports for the wires 13 between the time they enter and leave the heat-treating furnace are the skimmers in front and the guiding and tensioning rollers, just described, at the rear. This construction insures a proper tension on the wires through the furnace and prevents vibration or whipping thereof within the furnace. It will be further observed that with the provision of the chambers 23 in the housing 22 at the front and the chambers 34 in the housing 33 at the rear each wire entering and leaving the furnace is guided and held separated from the adjacent wires of the series.

The wires 13 are drawn from the reels 12, through the different units of the apparatus, including the heat-treating furnace, by the winding blocks 11. Between these blocks 11 and the heat-treating furnace are located first, the take-up frame 9 adjacent the furnace and the water cooling table 10. Reference being had to the take-up frame it will be observed that said frame is provided with a plurality of up-standing separated blades 39 between which the coated and heat-treated wires are drawn, and over guiding and tensioning rollers 40. While I have elected to show the wires 13 passing through the take-up frame substantially and approximately in a horizontal plane it is understood, if desirable, that I may arrange the guiding and tensioning rollers in series and in superimposed relation so that such wires will pass back and forth in the frame before leaving the same and which, naturally, would tend to increase the tension placed on the wires. Providing the take-up frame with the up-standing separated blades will tend to keep the wires separated from each other and from becoming entangled in the event of breakage.

After the coated and heat-treated wires leave the take-up frame they are passed over the water cooling table 10. This table, like the take-up frame, is provided with a plurality of upstanding spaced blades 41 between which the wires are caused to travel. The base of the grooves or channels formed by these blades being trough-shaped as at 42, see Fig. 6, which at their opposite ends connect with transversely arranged troughs 43 having drain pipes 44 connected thereto. Water is discharged or sprayed upon the wires passing over the water cooling table from a suitable piping arrangement 45 connecting with a suitable source of supply, not shown.

I have shown the skimmers located so that the drip will drain back into the molten-metal-bath. I do not desire by this showing to exactly locate the skimmers as it may be found desirable to drip back into a separate receptacle located between the baths and the heat-treating furnace, and thereby provide for bringing the operator into much closer contact with his work.

I have elected to show and describe only one heat-treating furnace unit, appreciating however that it might be found more desirable to provide one or more furnace units in line with each other. Using one furnace unit the guiding and tensioning devices for the wires could be located outside of and at either end of the furnace and by such means prevent vibration and whipping of the wires as they pass through the furnace. If the furnace unit should be unusually long it would be found desirable to support the wires within the heat-treating chambers on rolling surfaces adapted to travel at the same speed as the wires pass through the chambers. Therefore, I do not desire to be limited to the precise structural details shown as modifications may be made within the scope of the disclosure shown, as is apparent.

What I claim is:—

1. An apparatus comprising in combination, means for continuously coating a metallic article, and means for continuously heat-treating the coated article, so combined that the article passes directly from the coating means to the heat-treating means.

2. An apparatus for galvanizing wire and to produce a heavy zinc coating which is flexible, malleable and smooth, comprising in combination, means for continuously coating the wire, and means for continuously heat-treating the coated wire, so combined that the wire passes directly from the coating means to the heat-treating means.

3. An apparatus comprising in combination, means for continuously coating a metallic article, means for continuously heat-treating the coated article, and means for skimming the dross and other foreign matter adhering to the coating as the article leaves the coating means, so combined that the article passes directly from the coating means, over the skimming means to the heat-treating means.

4. An apparatus for galvanizing wire, comprising in combination, means for continuously coating the wires, a furnace for heat-treating the coated wires as they leave the coating means, and guiding and tensioning devices at either end of the furnace for preventing vibration and whipping of the coated wires within the furnace.

5. An apparatus for galvanizing wire, comprising in combination, means for continuously coating the wires, a furnace for heat-treating the coated wires, including heat-treating chambers through which the coated wires pass as they leave the coating means, and means at either end of the heat-treating chambers for retarding or reducing to a minimum the infiltration and circulation of air in said heat-treating chambers.

JOSEPH L. HERMAN.